(12) United States Patent
Kim et al.

(10) Patent No.: US 11,171,710 B2
(45) Date of Patent: Nov. 9, 2021

(54) COMMUNICATIONS DEVICE AND DATA RECEIVING METHOD THEREOF

(71) Applicant: SAMSUNG ELECTRONICS CO., LTD., Suwon-si (KR)

(72) Inventors: Ho Il Kim, Yongin-si (KR); Kwang Soon Kim, Seoul (KR)

(73) Assignees: SAMSUNG ELECTRONICS, CO., LTD., Suwon-si (KR); INDUSTRY—ACADEMIC COOPERATION FOUNDATION, YONSIE UNIVERSITY, Seoul (KR)

( * ) Notice: Subject to any disclaimer, the term of this patent is extended or adjusted under 35 U.S.C. 154(b) by 0 days.

(21) Appl. No.: 16/906,422

(22) Filed: Jun. 19, 2020

(65) Prior Publication Data
US 2021/0111782 A1  Apr. 15, 2021

(30) Foreign Application Priority Data
Oct. 15, 2019  (KR) .......................... 10-2019-0127841

(51) Int. Cl.
H04B 7/08 (2006.01)
G01S 3/48 (2006.01)
(Continued)

(52) U.S. Cl.
CPC ................ H04B 7/086 (2013.01); G01S 3/48 (2013.01); H04B 7/0617 (2013.01);
(Continued)

(58) Field of Classification Search
CPC .... H04B 7/086; H04B 7/0617; H04B 7/0413; H04B 7/088; H04B 7/0865; G01S 3/48;
(Continued)

(56) References Cited

U.S. PATENT DOCUMENTS 3,040,310 A * 6/1962 Hausz ...................... H01Q 3/00
342/80
3,176,297 A * 3/1965 Forsberg .................. H01Q 3/40
342/371
(Continued)

FOREIGN PATENT DOCUMENTS

JP  2003-255034  9/2003
JP  2011-022079  2/2011
(Continued)

Primary Examiner — Jean B Corrielus
(74) Attorney, Agent, or Firm — F. Chau & Associates, LLC

(57) ABSTRACT

A communications device and a data receiving method thereof are provided. The communications device includes: a receiver antenna receiving data; a receiver phase shifter forming a first sum beam and a first difference beam based on a first estimated direction-of-arrival (DOA); a receiver radio frequency (RF) chain generating first difference beam output using the first difference beam formed during a first data period of the received data and generating first sum beam output using the first sum beam formed in a second data period of the received data, which is different from the first data period; and a receiver controller calculating an offset vector between an actual DOA and the first estimated DOA based on the first difference beam output and the first sum beam output.

20 Claims, 13 Drawing Sheets

(51) Int. Cl.
*H04B 7/06* (2006.01)
*H04W 64/00* (2009.01)
*H04L 5/00* (2006.01)
*H04L 27/26* (2006.01)

(52) U.S. Cl.
CPC ......... *H04W 64/006* (2013.01); *H04L 5/0007* (2013.01); *H04L 27/2607* (2013.01)

(58) Field of Classification Search
CPC ........ G01S 3/38; G01S 3/023; H04W 64/006; H04L 5/0007; H04L 27/2607; H04L 5/0023; H04L 27/2601
See application file for complete search history.

(56) References Cited

U.S. PATENT DOCUMENTS

| | | | | |
|---|---|---|---|---|
| 5,469,172 | A * | 11/1995 | Schleder | G01S 7/4004 342/174 |
| 5,648,767 | A * | 7/1997 | O'Connor | G07B 15/063 340/928 |
| 6,075,484 | A | 6/2000 | Daniel et al. | |
| 6,930,637 | B2 | 8/2005 | Brothers, Jr. et al. | |
| 7,342,535 | B2 * | 3/2008 | Ann | G01S 3/74 342/154 |
| 7,515,892 | B2 | 4/2009 | Moon et al. | |
| 7,705,779 | B2 * | 4/2010 | Goldberg | H04B 7/0617 342/373 |
| 7,714,783 | B2 | 5/2010 | Niu et al. | |
| 8,933,840 | B2 * | 1/2015 | Hosoya | H04B 7/086 342/373 |
| 9,008,222 | B2 | 4/2015 | Stirling-Gallacher et al. | |
| 2003/0184473 | A1 * | 10/2003 | Yu | G01S 7/2813 342/380 |
| 2006/0246863 | A1 * | 11/2006 | Reed | H04B 7/088 455/276.1 |
| 2007/0135167 | A1 * | 6/2007 | Liu | H01Q 21/06 455/562.1 |
| 2008/0303718 | A1 * | 12/2008 | Chiang | H04B 7/0617 342/373 |
| 2009/0315412 | A1 * | 12/2009 | Yamamoto | H02J 50/27 307/149 |
| 2017/0223744 | A1 | 8/2017 | Qian et al. | |
| 2019/0293743 | A1 * | 9/2019 | Reisenfeld | G01S 3/043 |

FOREIGN PATENT DOCUMENTS

| | | |
|---|---|---|
| JP | 5553980 | 6/2014 |
| KR | 10-1021674 | 3/2011 |

* cited by examiner

COMMUNICATIONS DEVICE AND DATA RECEIVING METHOD THEREOF

CROSS-REFERENCE

This application claims priority under 35 U.S.C. § 119 to Korean Patent Application No. 10-2019-0127841, filed on Oct. 15, 2019, and all the benefits accruing therefrom, the disclosure of which is incorporated herein by reference in its entirety.

TECHNICAL FIELD

The present disclosure relates to radio frequency (RF) communications, and more particularly, to a communications device and a data receiving method thereof.

DESCRIPTION OF RELATED ART

After the commercialization of $4^{th}$ generation (4G) communications systems, efforts intensified to develop improved $5^{th}$ generation (5G) communications systems or pre-5G communications systems to meet the increasing demand for wireless data traffic. 5G communications systems or pre-5G communications systems are also referred to as beyond 4G network communications systems or post-long-term evolution (post-LTE) systems.

In order to achieve high data transmission rates, the implementation of 5G communications systems in millimeter wave (mmWave) bands of, for example, 60 GHz, has been considered. In connection with 5G communications systems, various techniques such as beamforming, massive multiple-input multiple-output (MIMO), full dimensional MIMO (FD-MIMO), array antennas, analog beam-forming, and large-scale antennas have been discussed to reduce propagation losses, and increase propagation distances, in mmWave bands.

Also, in order to improve the networks of 5G communications systems, various techniques have been developed such as evolved small cells, advanced small cells, cloud radio access networks (cloud RANs), ultra-dense networks, device-to-device (D2D) communications, wireless backhaul, moving networks, cooperative communications, coordinated multi-points (CoMPs), and interference cancellation.

Also, for 5G communications systems, various other techniques have been developed such as hybrid frequency shift keying (FSK)-and-quadrature amplitude modulation (FQAM) and sliding window superposition coding (SWSC), as advanced Coding modulation (ACM), filter bank multi-carrier (FBMC), non-orthogonal multiple access (NOMA), and sparse code multiple access (SCMA).

Meanwhile, in a 5G cyclic prefix (CP) MIMO-orthogonal frequency division multiplexing (OFDM) system, it is essential for terminals to precisely estimate the direction-of-arrival (DOA) of signals transmitted by a base station for smooth communications with the base station.

SUMMARY

Embodiments of the present disclosure provide a communications device for improving the stability and precision of direction-of-arrival (DOA) estimation using sum and difference beams.

Embodiments of the present disclosure also provide a data receiving method of a communications device for improving the stability and precision of DOA estimation using sum and difference beams.

It shall be understood that embodiments of the present disclosure are not restricted to those set forth herein. The above and other embodiments of the present disclosure will become more apparent to those of ordinary skill in the art to which the present disclosure pertains by referencing the detailed description of the present disclosure given below.

According to an embodiment of the present disclosure, there is provided a communications device comprising: a receiver antenna receiving data; a receiver phase shifter forming a first sum beam and a first difference beam based on a first estimated direction-of-arrival (DOA); a receiver radio frequency (RF) chain generating first difference beam output based on the first difference beam formed from a first data period of the received data and generating first sum beam output based on the first sum beam formed from a second data period of the received data, wherein the second data period is different from the first data period; and a receiver controller calculating an offset vector between an actual DOA and the first estimated DOA based on the first difference beam output and the first sum beam output.

According to the aforementioned and other embodiments of the present disclosure, there is provided a data receiving method of a communications device, comprising: receiving data via a receiver antenna; forming, by a receiver phase shifter, a first sum beam and a first difference beam based on a first estimated direction-of-arrival (DOA); generating, by a receiver radio frequency (RF) chain, first difference beam output based on the first difference beam formed from a first data period of the received data and generating, by the receiver RF chain, first sum beam output based on the first sum beam formed from a second data period of the received data, wherein the second data period is different from the first data period; and calculating, by a receiver controller, an offset vector between an actual DOA and the first estimated DOA based on the first difference beam output and the first sum beam output.

According to the aforementioned and other embodiments of the present disclosure, there is provided a communications device comprising: a receiver antenna receiving data at an actual direction-of-arrival (DOA); a receiver phase shifter forming a first sum beam and a first difference beam based on a first estimated DOA; a receiver radio frequency (RF) chain generating first difference beam output based on the first difference beam formed from a first data period of the received data and generating first sum beam output based on the first sum beam formed from a second data period of the received data, wherein the second data period is different from the first data period; a receiver controller calculating an offset vector between an actual DOA and the first estimated DOA based on the first difference beam output and the first sum beam output; and a phase controller generating a second estimated DOA by modifying the first estimated DOA based on the offset vector, the phase controller transmitting the second estimated DOA to the receiver phase shifter and allowing the receiver phase shifter to form a second sum beam and a second difference beam based on the second estimated DOA.

Other features and embodiments may be apparent from the following detailed description, the drawings and the claims.

BRIEF DESCRIPTION OF THE DRAWINGS

The above and other embodiments and features of the present disclosure will become more apparent by describing in detail embodiments thereof with reference to the attached drawings, in which.

DETAILED DESCRIPTION

Figure 1:
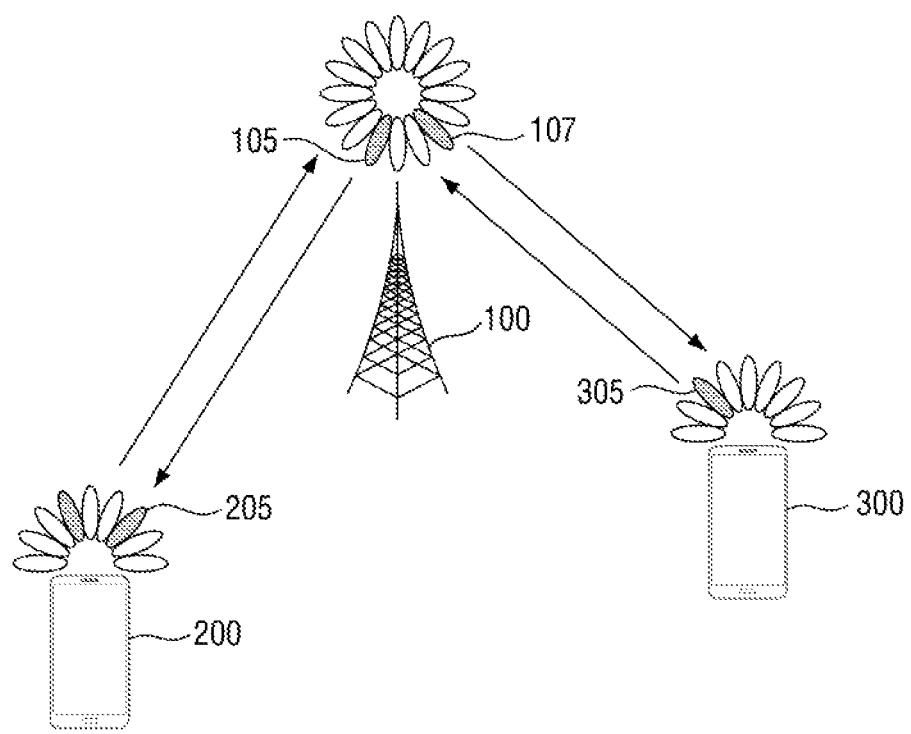
FIG. 1 is a schematic diagram illustrating a communications system according to an exemplary embodiment of the present disclosure.

FIG. 1 illustrates a communications system according to an exemplary embodiment of the present disclosure.

Referring to FIG. 1, the communications system according to an exemplary embodiment of the present disclosure includes, as nodes that use a wireless channel, a transmitter 100, a first communications device 200 and a second communications device 300. The types and/or the numbers of transmitters and communications devices provided in the communications system according to some embodiments of the present disclosure are not particularly limited.

The transmitter 100 may be network infrastructure that provides wireless access to the first and second communications devices 200 and 300. The transmitter 100 may have coverage, defined as a certain geographic area based on the distance over which the transmitter 100 can transmit signals. The transmitter 100 may be a base station, an access point (AP), an eNodeB (eNB), a 5$^{th}$ generation (5G) node, a wireless point or any equivalent thereof and may also be referred to by other names. In an exemplary embodiment, the transmitter 100 may be connected to one or more transmission/reception points (TRPs). The transmitter 100 may transmit to and receive from the communications devices 200 and 300 through each of the TRPs, and select particular TRPs to be used in transmitting and receiving signals to and from each communications device from among the TRPs. The transmitter 100 may transmit a downlink signal to, or receive an uplink signal from, the first or second communications device 200 or 300 via the TRPs.

The first and second communications devices 200 and 300 are devices used by users and can communicate with the transmitter 100 via wireless channels. At least one of the first and second communications devices 200 and 300 can be operated without the involvement of a user. That is, at least one of the first and second communications devices 200 and 300 may be a device that performs machine-type communications (MTC) and thus need not be carried around by a user. The first and second communications devices 200 and 300 may be referred to as terminals, user equipment (UE), mobile stations, subscriber stations, customer premises equipment (CPE), remote terminals, wireless terminals, electronic devices, user devices or any equivalents thereof.

The transmitter 100, the first communications device 200 and the second communications device 300 may transmit and receive wireless signals in a millimeter wave (mmWave) band of, for example, 28 GHz, 30 GHz, 38 GHz or 60 Ghz. The term "beam forming", as used herein, encompasses forming a transmission beam and/or forming a reception beam. That is, the transmitter 100, the first communications device 200 and the second communications device 300 may each impart directivity to transmission and/or reception signals. To this end, the transmitter 100, the first communications device 200 and/or the second communications device 300 may select serving beams 105, 107, 205 and 305 through a beam search or beam management procedure. Once the serving beams 105, 107, 205 and 305 are selected, communications can be performed through resources in a quasi-colocation (QCL) relationship with resources that have transmitted the serving beams 105, 107, 205 and 305.

The first or second communications device 200 or 300 may receive signals (or data) including system information from the transmitter 100. The first communications device 200 and/or the second communications device 300 may receive the system information when yet to be connected to the transmitter 100, such as, e.g., in a radio resource control (RRC) idle state. The first communications device 200 and/or the second communications device 300 may also receive the system information after being connected to the transmitter 100, such as, e.g., in an RRC connected state. The system information may include information for creating and setting a connection to the transmitter 100 and information for configuring and controlling an environment for communications with the transmitter 100.

The transmitter 100 may transmit signals or data including the system information. For example, the transmitter 100 may broadcast signals including the system information. The transmitter 100 may transmit signals via a broadcast channel, such as, e.g., a physical broadcast channel (PBCH). In another example, the transmitter 100 may broadcast signals including the system information via a shared channel, such as, e.g., a physical downlink shared channel (PDSCH). The transmitter 100 may repeatedly transmit signals including the system information.

The transmitter 100 may perform beam forming to transmit the system information. The transmitter 100 may transmit signals including the system information using different beams. The transmitter 100 may transmit signals through beam sweeping. The first communications device 200 and/or the second communications device 300 may acquire signals by receiving signals transmitted via beam forming. As will be described later, the first communications device 200 and/or the second communications device 300 can precisely estimate the direction-of-arrival (DOA) from the transmitter 100 by forming difference and sum beams in particular data sections.

Figure 2:
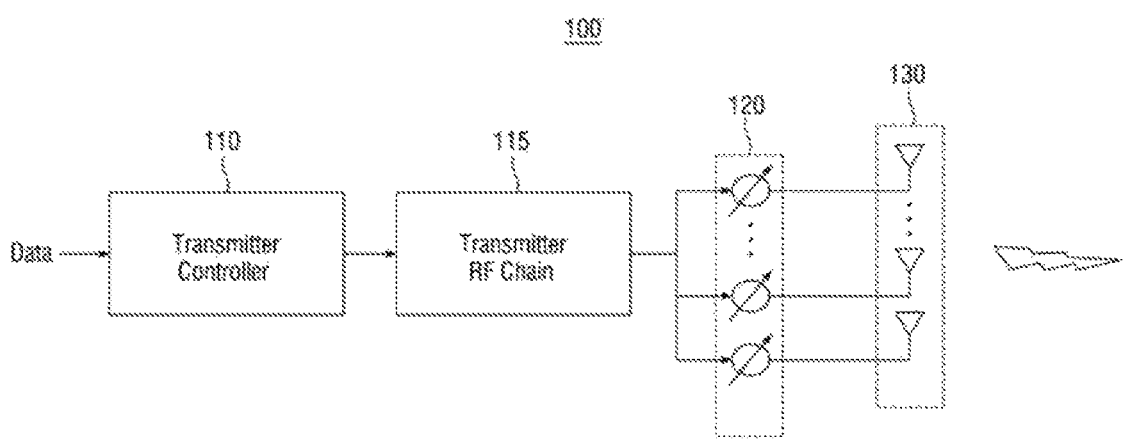
FIG. 2 is a block diagram of a transmitter that transmits data of the communications system of FIG. 1.

FIG. 2 illustrates a transmitter that transmits data of the communications system of FIG. 1.

Referring to FIG. 2, the transmitter 100 includes a transmitter controller 110, a transmitter radio frequency (RF) chain 115, a transmitter phase shifter 120 and a transmitter antenna 130.

The transmitter controller 110 may control general operations of the transmitter 100. For example, the transmitter controller 110 may receive data and may modulate the received data through binary phase shift keying (BPSK) or quadrature amplitude modulation (QAM). Also, the transmitter controller 110 may write data to, or read data from, a storage unit (not illustrated). Also, the transmitter controller 110 may perform the functions of a protocol stack such as defined by a communications standard. To this end, the transmitter controller 110 may include at least one processor (not illustrated). The functions of the transmitter controller 110 are not particularly limited.

The transmitter RF chain 115 may include, for example, a digital-to-analog converter (DAC). For example, the transmitter RF chain 115 may convert digital information received from the transmitter controller 110 into analog information and may transmit the analog information to the transmitter phase shifter 120. The functions of the transmitter RF chain 115 are not particularly limited.

The transmitter phase shifter 120 may include, for example, a mixer, a transmitter filter and/or a receiver filter. The transmitter phase shifter 120 may up-convert baseband signals into RF signals and may transmit the RF signals to the transmitter antenna 130 or may down-convert RF signals, received from the transmitter antenna 130, into baseband signals. Also, the transmitter phase shifter 120 may perform, for example, beam forming. That is, the transmitter phase shifter 120 may apply a beam forming weight to signals to be transmitted or received, to impart directivity as set by the transmitter controller 110. The transmitter phase shifter 120 may repeatedly transmit signals by changing beams being formed. The transmitter phase shifter 120 may consist of a plurality of phase shifters. The arrangement and the functions of the transmitter phase shifter 120 are not particularly limited.

The transmitter antenna 130 may transmit signals received from the transmitter phase shifter 120. The transmitter antenna 130 may consist of a plurality of antennas.

Figure 3:
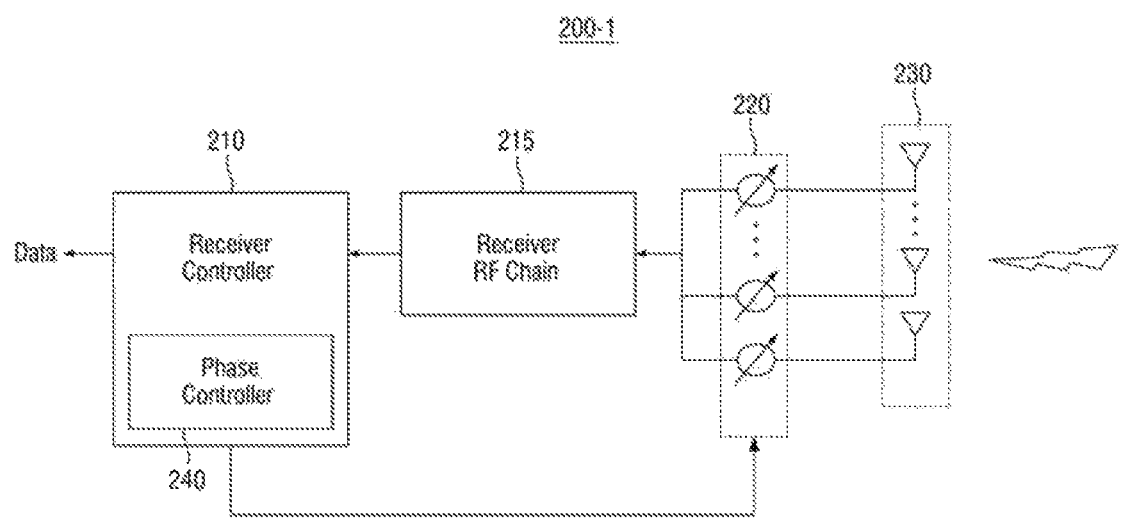
FIG. 3 is a block diagram of a communications device according to an exemplary embodiment of the present disclosure that receives data from the communications system of FIG. 1.
Figure 4:
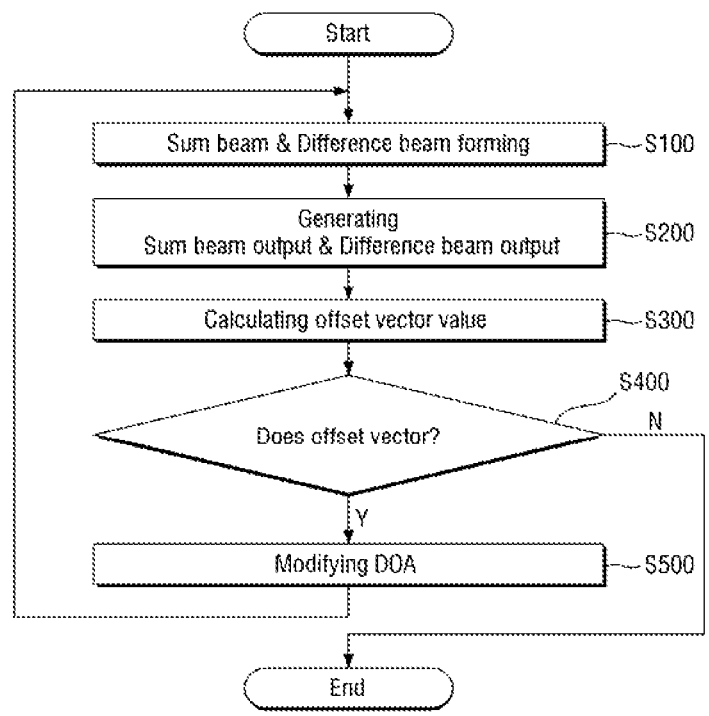
FIG. 4 is a flowchart diagram illustrating how the communications device of FIG. 3 receives data.
Figure 5:
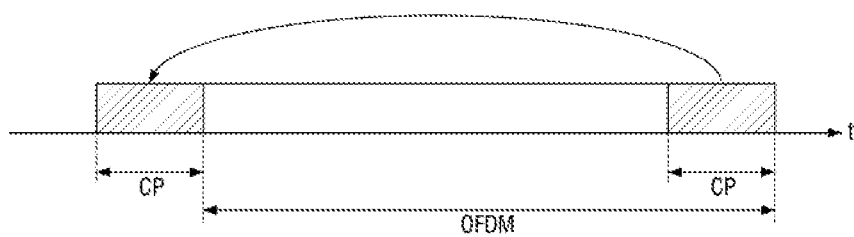
FIG. 5 is a data diagram illustrating an OFDM symbol according to an exemplary embodiment of the present disclosure, including a cyclic prefix (CP) part.
Figure 6:
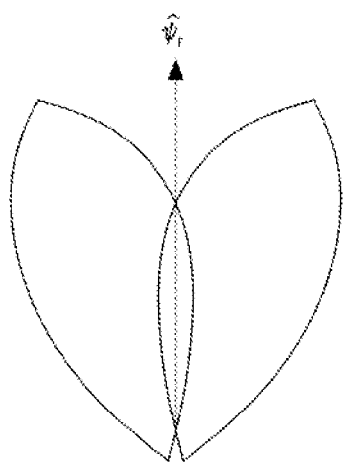
FIG. 6 is a radio frequency (RF) diagram illustrating a difference beam according to an exemplary embodiment of the present disclosure, formed based on an estimated DOA.
Figure 7:
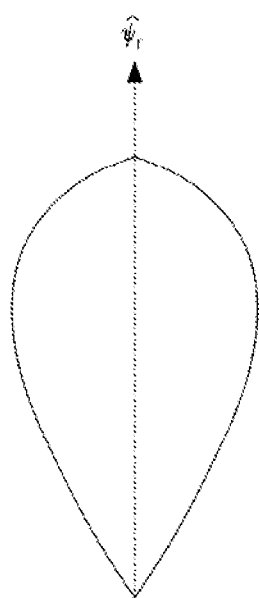
FIG. 7 is an RF diagram illustrating a sum beam according to an exemplary embodiment of the present disclosure, formed based on an estimated DOA.
Figure 8:
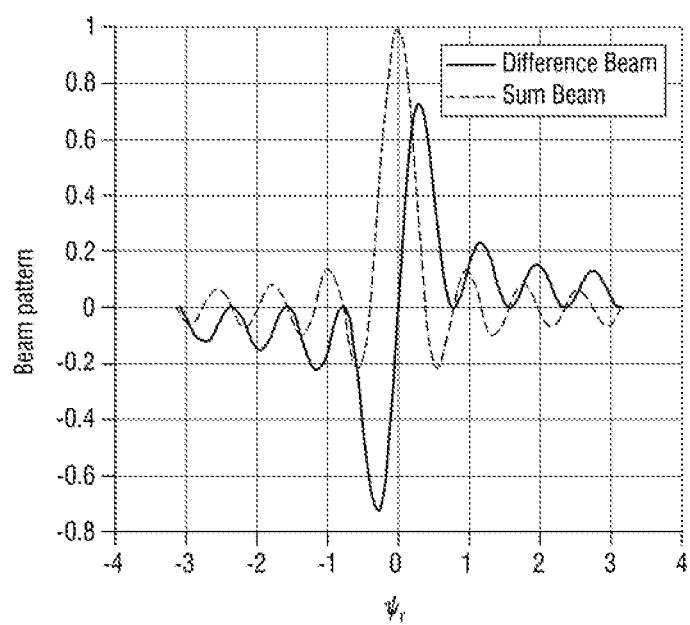
FIG. 8 is a graphical diagram illustrating a sum beam pattern and a difference beam pattern according to an exemplary embodiment of the present disclosure.
Figure 9:
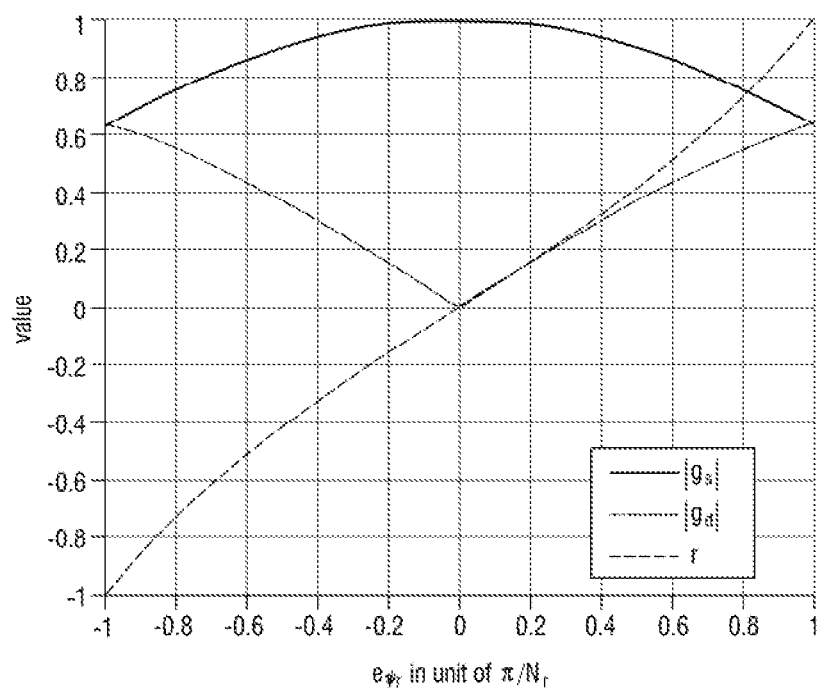
FIG. 9 is a graphical diagram illustrating the monopulses of sum beam output and difference beam output according to an exemplary embodiment of the present disclosure.

FIG. 3 illustrates a communications device according to an exemplary embodiment of the present disclosure that receives data from the communications system of FIG. 1. FIG. 4 illustrates how the communications device of FIG. 3 receives data. FIG. 5 illustrates an OFDM symbol according to an exemplary embodiment of the present disclosure, including a cyclic prefix (CP) part. FIG. 6 illustrates a difference beam according to an exemplary embodiment of the present disclosure, formed based on an estimated DOA. FIG. 7 illustrates a sum beam according to an exemplary embodiment of the present disclosure, formed based on an estimated DOA. FIG. 8 illustrates a sum beam pattern and a difference beam pattern according to an exemplary embodiment of the present disclosure. FIG. 9 illustrates monopulses of sum beam output and difference beam output according to an exemplary embodiment of the present disclosure.

Embodiments of the first or second communications device 200 or 300, i.e., communications devices 200-1, 200-2, 200-3 and 200-4 of FIGS. 3, 10, 11, and 12, will hereinafter be described.

Referring to FIG. 3, the communications device 200-1 may include a receiver controller 210, a receiver RF chain 215, a receiver phase shifter 220 and a receiver antenna 230. The receiver controller 210 may include a phase controller 240. However, the configuration of the communications device 200-1 is not limited to that illustrated in FIG. 3.

It will hereinafter be described how the communications device of FIG. 3 estimates DOA with reference to FIG. 4.

Referring to FIGS. 3 and 4, the receiver antenna 230 receives signals (or data) from the outside. The receiver phase shifter 220 may down-convert the received signals from RF signals to baseband signals.

The receiver phase shifter 220 may generate an analog beam forming vector. Specifically, the receiver phase shifter 220 may form a first sum beam and a first difference beam based on a first estimated DOA $\hat{\psi}_r$ at step S100 of FIG. 4. At step S200, the sum beam output and difference beam output are generated. At step S300, an offset vector vale is calculated. At step S400, control is passed to step S500 if a non-zero offset vector exists, or to an end block if no non-zero offset vector exists. In an alternate embodiment, control is passed to step S500 if the magnitude of the offset vector is greater than or equal to a threshold magnitude, such as, for example, $\pi/16$, or to the end block if the magnitude of the offset vector is less than the threshold magnitude. At step S500, the DOA is modified, and control is passed back to step S100. Here, the first sum beam may be applied to an OFDM data part, and the first difference beam may be applied to a CP part. The CP of an OFDM symbol will hereinafter be described with reference to FIG. 5.

Referring to FIG. 5, signals at the tail of an OFDM symbol are copied and may then be pasted to the head of an OFDM symbol, as a CP, to prevent destruction of the orthogonality between subcarriers of the OFDM symbol. That is, an OFDM symbol may be understood as being the sum of a CP part and an OFDM data part (or a valid OFDM symbol part).

By using a CP part, interference between adjacent symbols and between adjacent subcarriers can be prevented. Also, by repeating the tail of a symbol, the estimation of a channel or the processing of a frequency domain signal such as channel equalization at a receiving end can be facilitated.

Referring again to FIGS. 3 and 4, the first difference beam may be as illustrated in FIG. 6, and the first sum beam may be as illustrated in FIG. 7.

Referring to FIGS. 6 through 8, the beam pattern gain, at the first estimated DOA $\hat{\psi}_r$, of the first difference beam may be zero.

In order to make the gain (at, for example, the first estimated DOA $\hat{\psi}_r$) of signals incident from a particular direction zero (or null), the phases of the signals (or the first estimated DOA $\hat{\psi}_r$ of the signals) may be controlled by the receiver phase shifter 220. That is, two beams may be combined together to cause destructive interference.

The beam pattern gain, at the first estimated DOA $\hat{\psi}_r$, of the first sum beam, which is generated based on the first estimated DOA $\hat{\psi}_r$, may be one, as illustrated in FIG. 8. Here, the beam pattern gain of 1 is a value obtained through normalization.

In order to increase the gain (at, for example, the first estimated DOA $\hat{\psi}_r$) of signals incident from a particular direction, the phases of the signals may be equalized. That is, two beams may be combined together to cause constructive interference. This will be described in further detail with reference to Equations (1) and (2).

The receiver phase shifter 220 may form a first difference beam $w_d$, and the first difference beam $w_d$ may be indicated by Equation (1):

$$w_d = \frac{1}{\sqrt{N_r}}\left[-1, -e^{j\hat{\psi}_r}, \ldots, -e^{j\left(\frac{N_r}{2}-1\right)\hat{\psi}_r}, e^{j\frac{N_r}{2}\hat{\psi}_r}, \ldots, e^{j(N_r-1)\hat{\psi}_r}\right]^T \quad \text{(EQN. 1)}$$

The receiver phase shifter 220 may form a first sum beam $w_s$, and the first sum beam $w_s$ may be indicated by Equation (2).

$$w_s = \frac{1}{\sqrt{N_r}}\left[1, e^{j\hat{\psi}_r}, \ldots, e^{j(N_r-1)\hat{\psi}_r}\right]^T \quad \text{(EQN. 2)}$$

Referring to Equations (1) and (2), $N_r$ denotes the number of antennas of the receiver antenna 230, and j denotes an imaginary number of $\sqrt{-1}$.

The first difference beam $w_d$ may form a vector as illustrated in FIG. 6 that forms beams in both directions from the first estimated DOA $\hat{\psi}_r$. The first sum beam $w_s$ may form a vector as illustrated in FIG. 7 that forms beams in the same direction with respect to the first estimated DOA $\hat{\psi}_r$.

Referring again to FIGS. 3 through 5, the receiver RF chain 215 may generate first sum beam output and first difference beam output using the first sum beam and the first difference beam and the using data received via the receiver antenna 230.

The first sum beam output may be generated using a received sample of a first data part (e.g., an OFDM data part), and the first difference beam output may be generated using a received sample of a second data part (e.g., a CP part).

The precedence between the first and second data parts is not particularly limited. The first data part will hereinafter be described as being an OFDM data part, and the second data part will hereinafter be described as being a CP part, but either may be any data or signal part and embodiments are not limited thereto.

Specifically, an OFDM symbol y(k) may be indicated by Equation (3):

$$y(k) = w^H H f x(k) + w^H n(k) \quad \text{(EQN. 3)}$$

Referring to Equation (3), k ranges from 0 to $N_b-1$ where $N_b$ denotes the length of the entire OFDM symbol y(k), i.e., the sum of the lengths of a CP part and an OFDM data part of the OFDM symbol y(k).

Referring again to Equation (3), H denotes a channel matrix, and the channel matrix H may be indicated by Equation (4):

$$H = \alpha a_r(\psi_r) a_t(\psi_t)^H \quad \text{(EQN. 4)}$$

Referring to Equation (4), $\alpha = \sqrt{N_r N_t} g$, and the channel matrix H may have a complex normal distribution $g \sim CN(0, 1)$, $\psi_t$ denotes direction-of-departure (DOD) for the transmitted signal, and $\psi_r$ denotes DOA for the received signal. In the case of a uniform linear array, $$a_r(\psi_r) = \frac{1}{\sqrt{N_r}}\left[1, e^{j\psi_r}, \ldots, e^{j(N_r-1)\psi_r}\right]^T, \text{ and}$$

$$a_t(\psi_t) = \frac{1}{\sqrt{N_t}}\left[1, e^{j\psi_t}, \ldots, e^{j(N_t-1)\psi_t}\right]^T$$

where $a_r(\psi_r)$ and $a_t(\psi_t)$ denote a receiver array response vector and a transmitter array response vector, respectively.

Referring again to Equation (3), f denotes a transmitter analog beam forming vector, x(k) denotes a transmitter fast Fourier transformation (FFT) output sample, and n(k) denotes a noise vector of the receiver antenna 230. If $E[|x(k)|^2] = \sigma_s^2$ (where $E[|x(k)|^2]$ denotes the average power of the transmitter FFT output sample x(k), the n(k) may be modeled as $n(k) \sim CN(0, \sigma_n^2 I_{N_r})$.

Assuming that the transmitter analog beam forming vector f is $a_t(\psi_t)$, a reception signal in the OFDM symbol of Equation (3) may be indicated by Equation (5):

$$y(k) = \alpha w^H a_r(\psi_r) x(k) + w^H n(k) \quad \text{(EQN. 5)}$$

Referring to Equation (5), $\psi_r$ denotes a final or actual DOA to be estimated based on the first estimated DOA $\hat{\psi}_r$. The first estimated DOA $\hat{\psi}_r$ may be obtained through a preliminary operation such as beam sweeping.

In order to estimate the final DOA $\psi_r$, an offset vector $e_{\psi_r}$ between an estimated DOA and an actual DOA is calculated. That is, the offset vector $e_{\psi_r}$ may be obtained by subtracting the first estimated DOA $\hat{\psi}_r$ from the final DOA $\psi_r$, as indicated by Equation (6):

$$e_{\psi_r} = \psi_r - \hat{\psi}_r \quad \text{(EQN. 6)}$$

Phase-comparison monopulse, or phase-interferometry, may be used to accurately estimate the DOA of a signal from the phase difference of the signal measured on a plurality of separated antennas. The monopulse ratio is the ratio of the difference signal over the sum signal. The $e_{\psi_r}$ may be obtained using the monopulse ratio of the first sum beam output $y_s(k)$ and the first difference beam output $y_d(k)$. The first sum beam output $y_s(k)$ and the first difference beam output $y_d(k)$ may be represented by dividing the reception signal in the OFDM symbol into a CP part and an OFDM data part, for example, as shown in Equation (7):

$$y(k) = \begin{cases} \alpha w_d^H a_r(\psi_r) x(k) + w_d^H n(k), & k = 0, \ldots, N_g - 1 \\ \alpha W_s^H a_r(\psi_r) x(k) + w_s^H n(k), & k = N_g, \ldots, N_b - 1 \end{cases} \quad \text{(EQN. 7)}$$

The first difference beam output $y_d(k)$ and the first sum beam output $y_s(k)$ of Equation (7) may be redefined as shown in Equations (8) and (9):

$$y_d(k) = y(k) = \alpha g_d(e_{\psi_r}) x(k) + n_d(k), k=0, \ldots, N_g-1 \quad \text{(EQN. 8)}$$

$$y_s(k) = y(k+N) = \alpha g_s(e_{\psi_r}) x(k) + n_s(k), k=0, \ldots, N_g-1 \quad \text{(EQN. 9)}$$

In connection with the first difference beam output $y_d(k)$ and the first sum beam output $y_s(k)$, $g_d(e_{\psi_r}) = w_d^H a_r(\psi_r)$, $g_s(e_{\psi_r}) = w_s^H a_r(\psi_r)$, $n_d(k) = w_d^H n(k)$, and $n_s(k) = w_s^H n(k)$.

After the generation of the first difference beam output $y_d(k)$ and the first sum beam output $y_s(k)$, the receiver RF chain 215 may transmit the first difference beam output $y_d(k)$ and the first sum beam output $y_s(k)$ to the receiver controller 210.

The receiver controller 210 may calculate the offset vector $e_{\psi_r}$ based on the first difference beam output $y_d(k)$ and the first sum beam output $y_s(k)$ (S300). S300 will hereinafter be described in detail with reference to FIG. 9.

Referring to FIGS. 3 and 9, the offset vector $e_{\psi_r}$ may be calculated using the monopulse ratio of the first difference beam output $y_d(k)$ and the first sum beam output $y_s(k)$. The monopulse ratio of the first difference beam output $y_d(k)$ and the first sum beam output $y_s(k)$ may be defined as indicated by Equation (10):

$$r(e_{\psi_r}) = \text{Im}\left[\frac{g_d(e_{\psi_r})}{g_s(e_{\psi_r})}\right] \quad \text{(EQN. 10)}$$

Equation (10) may be rearranged into Equation (11):

$$r(e_{\psi_r}) = \text{Im}\left[j\tan\left(\frac{N_r}{4}e_{\psi_r}\right)\right] = \tan\left(\frac{N_r}{4}e_{\psi_r}\right) \quad \text{(EQN. 11)}$$

That is, the monopulse ratio of the first difference beam output $y_d(k)$ and the first sum beam output $y_s(k)$ includes information regarding the offset vector $e_{\psi_r}$. In order to extract the offset vector $e_{\psi_r}$, a maximum likelihood estimation R for the monopulse ratio of the first difference beam output $y_d(k)$ and the first sum beam output $y_s(k)$ may be defined as indicated by Equation (12):

$$R = \frac{\text{Im}\left[\sum_{k=N_s}^{N_e} y_d(k) y_d^*(k)\right]}{\sum_{k=N_s}^{N_e} y_s(k) y_s^*(k)}, \quad \text{(EQN. 12)}$$

$$0 \leq N_s < N_e \leq N_g - 1$$

Here, it may be assumed that a start sample index $N_s$ and an end sample index $N_e$ are set in consideration of the characteristics of the communications device 200-1 such as delay spread. The offset vector $e_{\psi_r}$ may be obtained by applying an inverse tangent function to the maximum likelihood estimation R of Equation (12), as indicated by Equation (13):

$$e_{\psi_r} = \frac{4}{N_r}\tan^{-1}(R) \quad \text{(EQN. 13)}$$

Referring to the graph of FIG. 9, the horizontal axis corresponds to the offset vector $e_{\psi_r}$, and the vertical axis represents monopulse ratios. That is, DOA can be estimated by estimating the offset vector $e_{\psi_r}$ based on a monopulse ratio, but the present disclosure is not limited thereto.

Referring again to FIGS. 3 and 4, the phase controller 240 may determine whether the offset vector $e_{\psi_r}$ calculated by the receiver controller 210 is within a predetermined allowable range (S400). In response to a determination being made that the offset vector $e_{\psi_r}$ calculated by the receiver controller 210 is within a predetermined allowable range, the phase controller 240 does not modify the first estimated DOA $\hat{\psi}_r$. Accordingly, the receiver controller 210 may determine data transmitted by the transmitter 100 as having been received at a proper actual DOA, may demodulate the received data, and may provide the demodulated data to a user.

However, in response to a determination being made that the offset vector $e_{\psi_r}$ calculated by the receiver controller 210 is not within a predetermined allowable range, the phase controller 240 may modify the first estimated DOA $\hat{\psi}_r$ and may transmit the result of the modification to the receiver phase shifter 220 as a second estimated DOA $\hat{\psi}_{r,2}$ (S500). S500 will hereinafter be described in detail with reference to Equation (14):

$$\hat{\psi}_{r,2} = \hat{\psi}_r + \beta \cdot e_{\psi_r} \quad \text{(EQN. 14)}$$

Equation (14) uses a first-order loop, but the present disclosure is not limited thereto. Alternatively, Equation (14) may use a second- or higher-order loop.

That is, the phase controller 240 may calculate the second estimated DOA $\hat{\psi}_{r,2}$ by reflecting a value obtained by combining the offset vector $e_{\psi_r}$ and loop gain $\beta$ into the first estimated DOA $\hat{\psi}_r$.

The phase controller 240 may transmit the second estimated DOA $\hat{\psi}_{r,2}$ to the receiver phase shifter 220, and the receiver phase shifter 220 may form a second difference beam $w_{d,2}$ and a second sum beam $w_{s,2}$ based on the second estimated DOA $\hat{\psi}_{r,2}$. The second difference beam $w_{d,2}$ and the second sum beam $w_{s,2}$ may have the second estimated DOA $\hat{\psi}_{r,2}$, whereas the first difference beam $w_d$ and the first sum beam $w_s$ may have the first estimated DOA $\hat{\psi}_r$.

The communications device 200-1 may receive data via beams that reflect an actual DOA calculated in the aforementioned manner.

After the calculation of sum beam output and difference beam output, the receiver RF chain 215 abandons the CP part of an OFDM symbol. Accordingly, since no additional beam forming values are output in the OFDM data part of the OFDM symbol, the precision of DOA estimation can be improved without affecting the data reception reliability of the communications device 200-1. Also, the reliability of DOA estimation can be improved by feeding back estimated DOA values that continue to vary, via the receiver phase controller 240.

Figure 10:
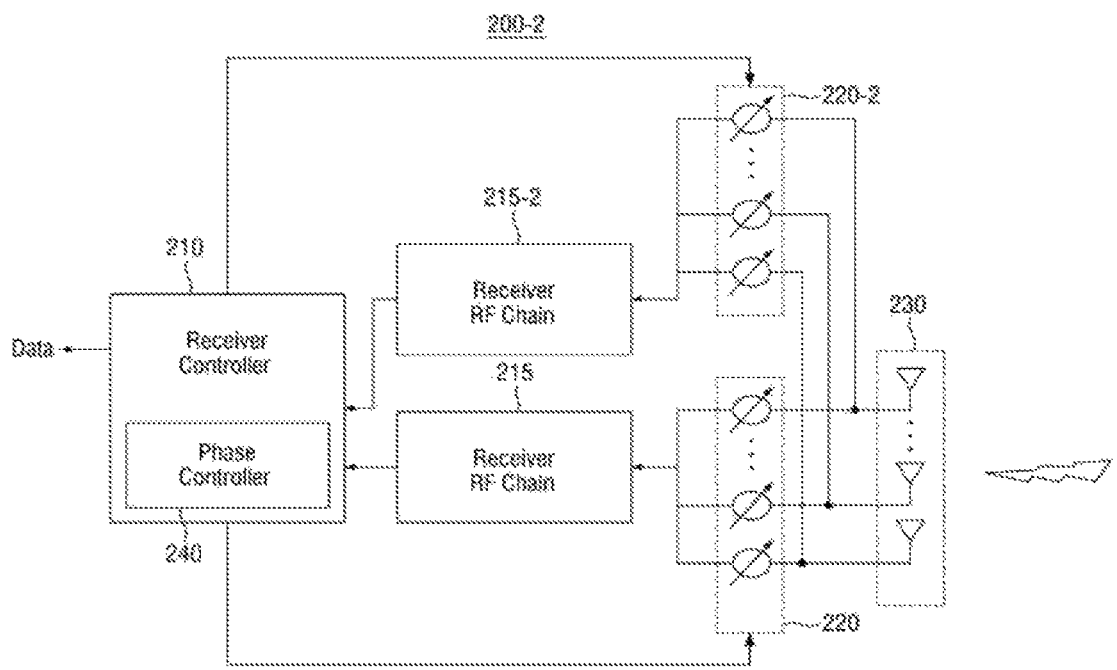
FIG. 10 is a block diagram of communications device according to an exemplary embodiment of the present disclosure that receives data from the communications system of FIG. 1.
Figure 11:
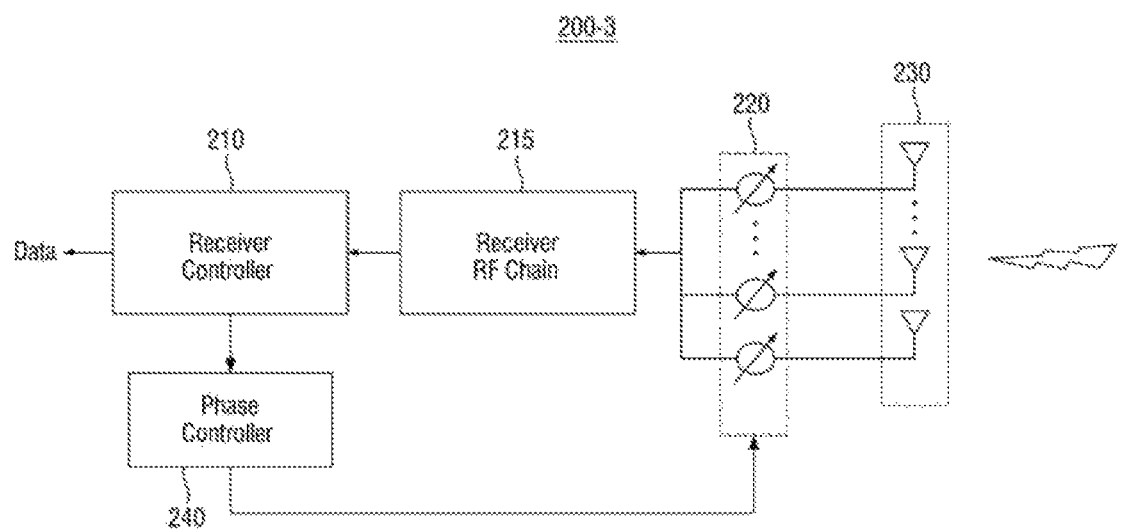
FIG. 11 is a block diagram of communications device according to an exemplary embodiment of the present disclosure that receives data from the communications system of FIG. 1.
Figure 12:
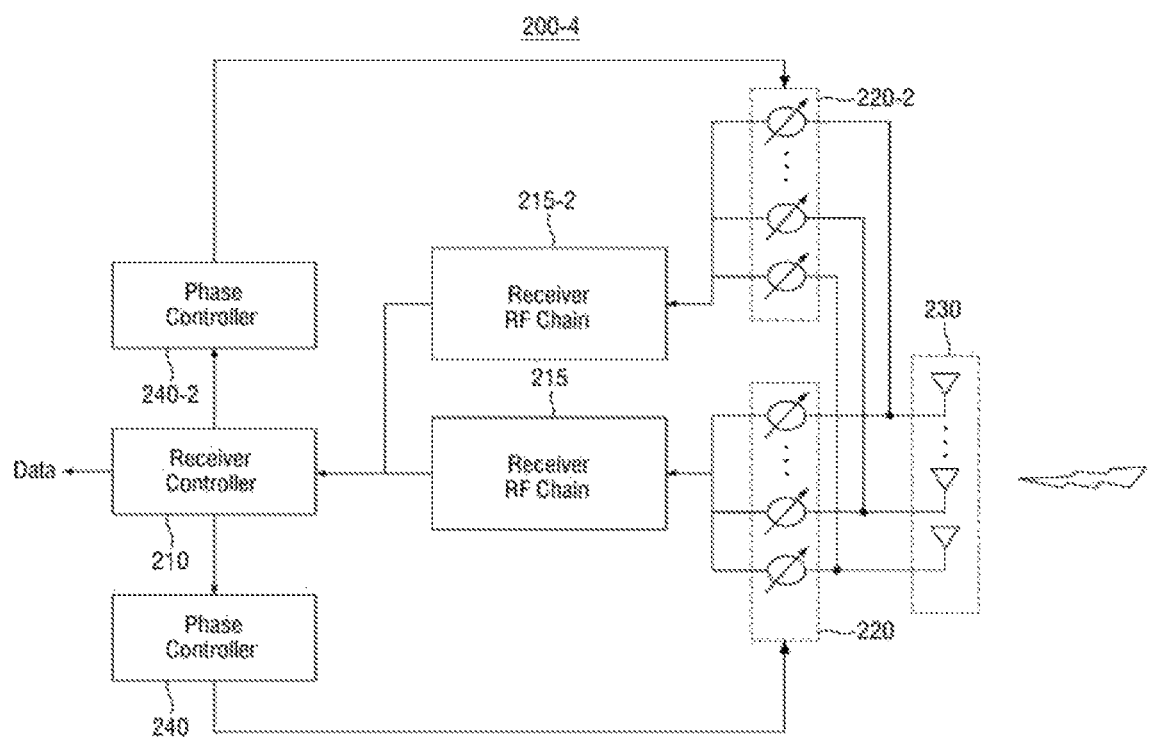
FIG. 12 is a block diagram of communications device according to an exemplary embodiment of the present disclosure that receives data from the communications system of FIG. 1.

The communications devices 200-2, 200-3, and 200-4 of FIGS. 10, 11, and 12 are similar to the communications device 200-1 of FIG. 3 and thus will hereinafter be described, focusing mainly on the differences with the communications device 200-1 of FIG. 3.

FIGS. 10 through 12 illustrate communications devices according to exemplary embodiments of the present disclosure that receive data from the communications system of FIG. 1.

Referring to FIG. 10, the communications device 200-2, unlike the communications device 200-1 of FIG. 3, includes a plurality of receiver RF chains 215 and 215-2 and a plurality of receiver phase shifters 220 and 220-2.

The receiver phase shifter 220-2 may be connected to a receiver antenna 230, and the receiver phase shifters 220 and 220-2 may be connected in parallel to the receiver antenna 230. Specifically, the receiver phase shifter 220 may be connected to the receiver RF chain 215, and the receiver phase shifter 220-2 may be connected to the receiver RF chain 215-2.

The receiver RF chain 215 may calculate difference beam output and sum beam output based on a difference beam and a sum beam that are formed by the receiver phase shifter 220, and a receiver controller 210 may calculate an offset vector between an estimated DOA from the receiver phase shifter 220 and an actual DOA based on the difference beam output and the sum beam output. A phase controller 240 may modify the estimated DOA, or stop modifying the estimated DOA, based on the calculated offset vector. In a case where the phase controller 240 stops modifying the estimated DOA, the receiver controller 210 may demodulate data received via the receiver antenna 230 and may provide the demodulated data to a user.

Similarly, the receiver RF chain 215-2 may calculate difference beam output and sum beam output based on a difference beam and a sum beam that are formed by the receiver phase shifter 220-2, and a receiver controller 210 may calculate an offset vector between an estimated DOA from the receiver phase shifter 220-2 and the actual DOA based on the difference beam output and the sum beam output. The phase controller 240 may modify the estimated DOA, or stop modifying the estimated DOA, based on the calculated offset vector. In a case where the phase controller 240 stops modifying the estimated DOA, the receiver controller 210 may demodulate data received via the receiver antenna 230 and may provide the demodulated data to the user.

Referring to FIG. 11, a phase controller 240 of the communications device 200-3, unlike the phase controller 240 of the communications device 200-1 of FIG. 3, may be disposed on the outside of a receiver controller 210. The phase controller 240 may or may not modify an estimated DOA from a receiver phase shifter 220 based on an offset vector received from the receiver controller 210.

Referring to FIG. 12, the communications device 200-4, unlike the communications device 200-2 of FIG. 10, may include a plurality of phase controllers 240 and 240-2.

The phase controller 240 may or may not modify an estimated DOA from a receiver phase shifter 220 based on an offset vector calculated using difference beam output and sum beam output generated by a receiver RF chain 215.

The phase controller 240-2 may or may not modify an estimated DOA from a receiver phase shifter 220-2 based on an offset vector calculated using difference beam output and sum beam output generated by a receiver RF chain 215-2.

Figure 13:
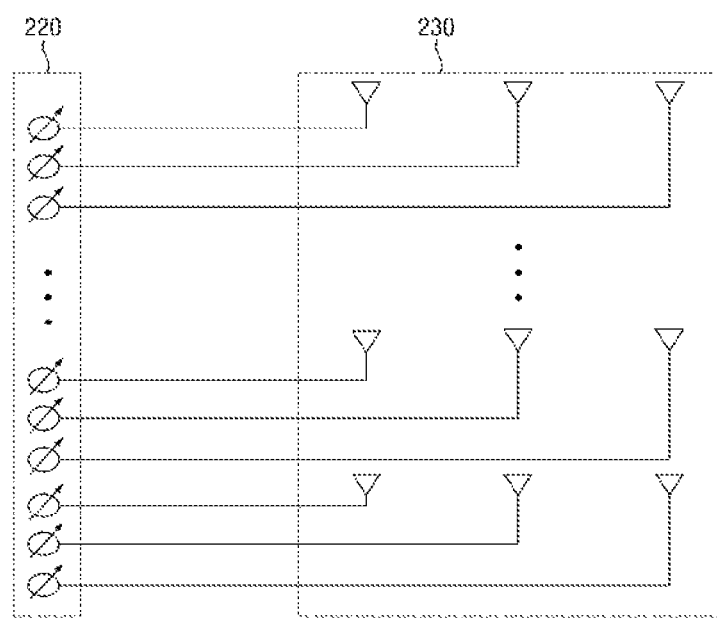
FIG. 13 is a block diagram illustrating a receiver phase shifter and a receiver antenna of a communications device according to an exemplary embodiment of the present disclosure.

FIG. 13 illustrates a receiver phase shifter and a receiver antenna of a communications device according to an exemplary embodiment of the present disclosure.

A receiver antenna 230 of the communications device 200-1, 200-2, 200-3, or 200-4 may be a uniform planar antenna, as illustrated in FIG. 13. A receiver phase shifter 220 may be connected to the receiver antenna 230.

While the inventive concept has been particularly shown and described with reference to exemplary embodiments thereof, it shall be understood that those of ordinary skill in the pertinent art may make various changes in form and details without departing from the scope or spirit of the inventive concept as set forth in the following claims and their equivalents.

What is claimed is:

1. A communications device comprising:
a receiver antenna receiving data;
a receiver phase shifter forming a first sum beam and a first difference beam based on a first estimated direction-of-arrival (DOA);
a receiver radio frequency (RF) chain generating first difference beam output based on the first difference beam formed from a first data period of the received data and generating first sum beam output based on the first sum beam formed from a second data period of the received data, wherein the second data period is different from the first data period; and
a receiver controller calculating an offset vector between an actual DOA and the first estimated DOA based on the first difference beam output and the first sum beam output.

2. The communications device of claim 1, wherein
the receiver controller includes a phase controller, and
the phase controller generates a second estimated DOA by modifying the first estimated DOA based on the offset vector, transmits the second estimated DOA to the receiver phase shifter, and allows the receiver phase shifter to form a second sum beam and a second difference beam based on the second estimated DOA.

3. The communications device of claim 2, wherein the first data period precedes the second data period.

4. The communications device of claim 3, wherein
the first data period includes a cyclic prefix (CP) part, and
the second data period includes an orthogonal frequency division multiplexing (OFDM) data part.

5. The communications device of claim 1, wherein
the first data period includes an orthogonal frequency division multiplexing (OFDM) data part, and
the second data period includes a cyclic prefix (CP) part.

6. The communications device of claim 1, wherein the receiver antenna is arranged as a uniform linear antenna.

7. The communications device of claim 1, wherein the receiver antenna is arranged as a uniform planar antenna.

8. The communications device of claim 1, wherein the offset vector is calculated using a monopulse ratio of the actual DOA and the first estimated DOA.

9. The communications device of claim 1, further comprising:
a second receiver phase shifter connected to the receiver antenna.

10. A data receiving method of a communications device, comprising:
receiving data via a receiver antenna;
forming, by a receiver phase shifter, a first sum beam and a first difference beam based on a first estimated direction-of-arrival (DOA);
generating, by a receiver radio frequency (RF) chain, first difference beam output based on the first difference beam formed from a first data period of the received data and generating, by the receiver RF chain, first sum beam output based on the first sum beam formed from a second data period of the received data, wherein the second data period is different from the first data period; and
calculating, by a receiver controller, an offset vector between an actual DOA and the first estimated DOA based on the first difference beam output and the first sum beam output.

11. The data receiving method of claim 10, further comprising:
generating, by a phase controller, a second estimated DOA by modifying the first estimated DOA based on the offset vector, transmitting, by the phase controller, the second estimated DOA to the receiver phase shifter, and allowing, by the phase controller, the receiver phase shifter to form a second sum beam and a second difference beam based on the second estimated DOA.

12. The data receiving method of claim 11, wherein the first data period precedes the second data period.

13. The data receiving method of claim 12, wherein
the first data period includes a cyclic prefix (CP) part, and
the second data period includes an orthogonal frequency division multiplexing (OFDM) data part.

14. The data receiving method of claim 10, wherein
the first data period includes an orthogonal frequency division multiplexing (OFDM) data part, and
the second data period includes a cyclic prefix (CP) part.

15. The data receiving method of claim 10, wherein the receiver antenna is arranged as a uniform linear antenna.

16. The data receiving method of claim 10, wherein the receiver antenna is arranged as a uniform planar antenna.

17. The data receiving method of claim 10, wherein the offset vector is calculated using a monopulse ratio of the actual DOA and the first estimated DOA.

18. The data receiving method of claim 10, further comprising a second receiver phase shifter being connected with the receiver antenna.

19. A communications device comprising:
- a receiver antenna receiving data at an actual direction-of-arrival (DOA);
- a receiver phase shifter forming a first sum beam and a first difference beam based on a first estimated DOA;
- a receiver radio frequency (RF) chain generating first difference beam output based on the first difference beam formed from a first data period of the received data and generating first sum beam output based on the first sum beam formed from a second data period of the received data, wherein the second data period is different from the first data period;
- a receiver controller calculating an offset vector between an actual DOA and the first estimated DOA based on the first difference beam output and the first sum beam output; and
- a phase controller generating a second estimated DOA by modifying the first estimated DOA based on the offset vector, the phase controller transmitting the second estimated DOA to the receiver phase shifter and allowing the receiver phase shifter to form a second sum beam and a second difference beam based on the second estimated DOA.

20. The communications device of claim 19, wherein the first data period includes a cyclic prefix (CP) part, and the second data period includes an orthogonal frequency division multiplexing (OFDM) data part.

\* \* \* \* \*